Sept. 7, 1954     H. J. M. FÖRSTER     2,688,256
VARIABLE DRIVE RATIO TRANSMISSION
Filed Sept. 7, 1950
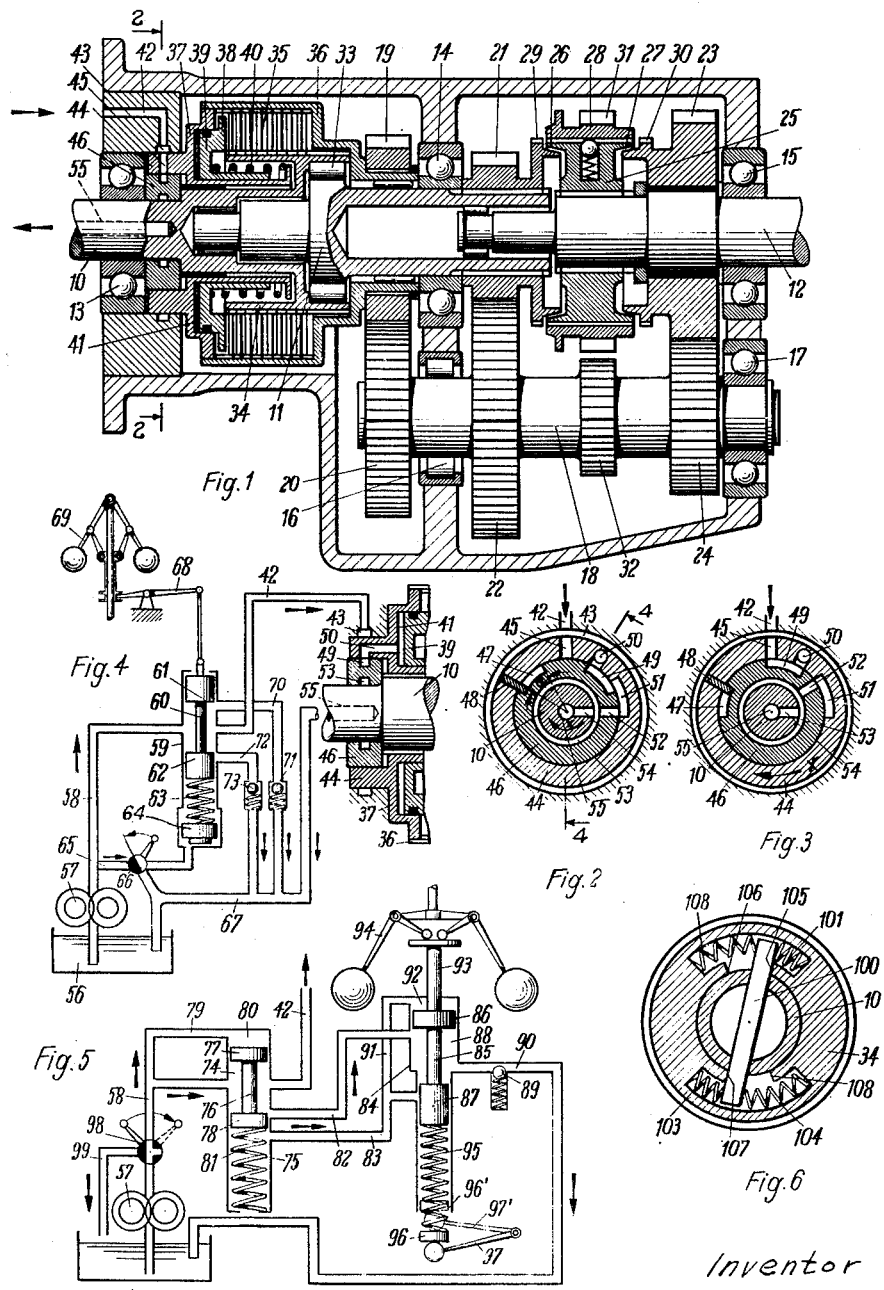
Inventor
Hans Joachim Max Förster
By Hicke and Padlon
Attorneys Patented Sept. 7, 1954

2,688,256

UNITED STATES PATENT OFFICE 2,688,256

VARIABLE DRIVE RATIO TRANSMISSION

Hans J. M. Förster, Harthausen a. F., Kr. Esslingen (Neckar), Germany, assignor to Daimler-Benz Aktiengesellschaft, Stuttgart-Unterturkheim, Germany Application September 7, 1950, Serial No. 183,601

Claims priority, application Germany September 8, 1949

14 Claims. (Cl. 74—336.5)

The invention refers to a shifting for change gears, particularly for motor vehicles.

One object of the invention is a simplified shifting of the transmission. Particularly the shifting of the gear ratio shall be carried out at least partially automatically and as much as possible without impact.

It is a further object of the invention to get along with only a small number of shift couplings and as small couplings as possible.

A further object of the invention is, while a one-way clutch is used, which transmits a drive only in one driving direction, to guarantee that the drive is not interrupted upon reversing of the driving direction.

A further object of the invention is to be able to utilize the engine in a suitable manner as a brake upon reversing of the driving direction, i. e. for example upon driving of the transmission by the vehicle axle, and to make feasible a return to the original driving condition at a relatively small acceleration of the engine. In addition the transmission is to permit a backward rolling of the vehicle in case of utilization in vehicles.

It is a further object of the invention that upon reversing of the driving direction automatic shifting takes place to another, preferably higher gear and upon return to the original driving direction back to the former, preferably lower gear. Particularly this shifting is, however, to take place in dependence upon a certain operation factor in such a manner that the shifting to the lower gear is eliminated to the original driving direction, respectively for both driving directions the higher gear is shifted for both driving directions, if that operation factor, particularly the number of revolutions of the driven gear shaft, respectively the traveling speed exceeds a certain value.

A further object of the invention consists of the control of a shifting coupling, which is arranged in a transmission ratio which by-passes the freewheel arrangement, in such a manner that it can transmit either only a torque in that driving direction, which is opposite to the direction of the torque to be transmitted by the freewheel, or can transmit a torque in both driving directions.

A further object of the invention consists of a change gear, the transmission ratios of which are subdivided in groups, the groups of which have common shift couplings for automatic shifting of the gears in question; furthermore the automatic action of the shifting of these gears is to be adjusted to the gear group interposed in each case.

Further objects of the invention refer among other things to the construction of the shifting system, particularly utilizing a hydraulic shifting medium, the utilization of particularly suitable shifting members for automatic shifting, a particularly suitable construction of the transmission and a particularly suitable arrangement of the individual gear members. Further objects as well as characteristics of the invention are to be taken from the following description of examples of construction, i. e.:

Figure 1 shows a longitudinal cut through a motor vehicle transmission with four forward speeds, Figure 2 shows a section through the shifting device along the line 2—2 of Figure 1, Figure 3 shows the same section in another shifting position of the utilized shifting ring, Figure 4 shows a diagram for an example of a shifting of the gear, whereby the cut is made through the gear along line 4—4 of Figure 2, Figure 5 shows a diagram illustrating another example of possible shifting, Figure 6 a section through a form of construction of a disk bearer supported in a manner to give way to rotation.

In the example of construction in accordance with Figure 1, the numeral 10 shows the driving shaft driven by the engine for example through a usual motor clutch, 11 shows an intermediate shaft and 12 the driven shaft of the transmission leading for example to the rear axle of the vehicle. The shafts 10 and 12 are supported in the transmission casing by the bearings 13 and 15, respectively. The shaft 11 is supported relative to shaft 10 by a needle bearing at its forward end and is supported relative to the shaft 12 by the needle bearing shown and relative to the transmission housing by the ball bearing 14. Parallel to the main shaft system formed by the shafts 10, 11, 12 provision is made for a countershaft 18, supported in the transmission casing by the bearings 16, 17. The countershaft is in driving connection, or can be brought into driving connection with the main shaft system by the pairs of toothed wheels 19—20, 21—22 and 23—24, which are constantly in mesh. The pairs of toothed wheels 19—20 and 21—22 are hereby arranged directly on opposite sides of the bearings 14 and 16, the pair of toothed wheels 23—24 directly beside the bearings 15 and 17, so that a particularly quiet transmission results.

The toothed wheels 20, 22 and 24 are rigidly connected to the countershaft 18, likewise the toothed wheel 21 with the intermediate shaft 11. The toothed wheel 23 is supported by the driven shaft 12 in a loosely rotatory manner. A synchronizing coupling 25 serves for changing coupling of the intermediate gear 21 and the toothed wheel 23 with the driven shaft 12. The coupling 25 consists of conical friction couplings 26, 27 and of a shift sleeve 28, the key grooves of which can be brought into mesh with the claws 29, 30 of the toothed wheels 21 and 23 and which are coupled with the coupling member 25 by splines. The shift sleeve 28 carries a toothed rim 31, which can be coupled through a special reverse gear (not shown in the drawing) with the toothed wheel 32 on the countershaft for providing a reverse drive.

The synchronizing coupling can in a manner, which is known in itself, for example also be provided with special bolt members, which necessarily prevents an engaging of the sleeve 28 into the claws 29, 30, until complete synchronism is reached. For this purpose the friction surfaces 26 and 27 of the coupling member 25 can have a limited play to the latter in the direction of rotation.

Between the driving shaft 10 and the intermediate shaft 11 a freewheel 33 is inserted in such a manner, that upon driving of the shaft 10 in forward direction of rotation by the engine (direction of rotation $x$ in Figure 3) the intermediate shaft 11 is coupled to the driving shaft 10 by the jamming effect of the freewheel and is engaged by it in driving direction of rotation; the driving, however, is interrupted, when the intermediate shaft 11—for example upon throttling of the engine and pushing vehicle—overruns the driving shaft 10. The flange or husk shaped part 34 of the driving shaft 10 serving as an outer ring for the freewheel 33 is simultaneously inside bearer for the disks of the multiple disk clutch 35, the outside bearer 36 of which is rigidly connected on one hand with the toothed wheel 19, which is supported by the intermediate shaft 11 in a loosely rotary manner, and on the other hand with the shifting cylinder 37, which is supported in a loosely rotary manner by the driving shaft 10. In the latter a piston 39 is arranged, which bears the pressure piece 38 for the multiple disk clutch. The latter is on one hand pressed to the left by a spring 40 and can on the other hand be brought under the effect of a pressure medium, which acts in the pressure space 41.

A liquid, for example pressure oil, which is introduced by a conduit 42, serves as a pressure medium. The liquid passes into an annular groove 43, which surrounds the annular control part 44 of the shifting cylinder 37. A cross bore 45 leads to the outer surface of a jumper ring 46, which is inserted between the driving shaft 10 and the control part 44. The jumper ring 46 is connected with the driving shaft 10 by friction contact, but for the rest it may be limitlessly turned in regard to same, while it can turn in regard to the control part 44 only by a limited angle (Fig. 2), which is determined by a stop groove 47 and a stop finger 48, which is inserted into the part 44. The jumper ring 46 has a further control groove 49, which is during driving of the engine, i. e. during driving of the shaft 10 relatively to the control part 44 in the direction $x$ (Fig. 2), connected with the pressure space 41 through a longitudinal bore 50 in the part 44 and it communicates furthermore with a return piping, which is for example formed by a longitudinal bore 55 in the driving shaft 10, through a groove 51 in the part 44, a cross bore 52 and annular groove 53 as well as a radial bore 54 in the shaft 10. While the vehicle pushes the engine and thereby during driving of the control part 44 relatively to the shaft 10 in the direction $x$ (Fig. 3), the groove 51 is separated from the control groove 49 and the latter is brought in connection with the conduit 42 through the bore 45.

An example of a control arrangement for the transmission is shown in form of a diagram in Figure 4. A shifting liquid, for example lubricating oil, is delivered from a container 56 by a pump 57, which is for example driven by the driving shaft 10, through a pipe line 58 into a control cylinder 59.

A control slide 60 with the control edges 61 and 62 is slidable in the cylinder 59, which slide is pressed upward under the effect of a regulating spring and from which the already mentioned conduit 42 branches off. The regulating spring 63 is supported against a piston 64, the lower surface of which can be placed under pressure through a pipe line 65 by the pump 57 or a further pump, in such a manner that for example a control valve 66 brings the pipe line 65 into connection either with the lower surface of the piston 64 or with the return piping 67, respectively the container 56 or the like. The control slide 60 is furthermore operated through push rods 68 by a governor 69 of any type, which is for example driven by the driven shaft 12 of the transmission, in such a manner that in the lower range of regulation of the governor the control slide 60 is (as shown in the drawing) in an upper position, however, in the upper range of regulation is changed downward. Furthermore a return piping 70 with a spring-loaded relief valve 71 and a return piping 72 with a spring-loaded relief valve 73 branch off from the cylinder 59. The pipe lines 70 and 72 are hereby controlled by the control edges 61 and 62 of the slide 60. The spring pressure of the relief valve 71 is furthermore less than the spring pressure of the relief valve 73.

The manner of action of the transmission is the following:

*First gear.*—At the starting of the vehicle the change coupling 25, 28 is shifted to the right, so that it couples the toothed wheel 23 with the driven shaft 12. After engaging the main coupling the driving shaft overtakes the intermediate shaft 11, whereby the freewheel rolls 33 are brought into jamming position. The driving is then operated from the driving shaft 10 through the freewheel 33 to the intermediate shaft 11 from this through the toothed wheels 21, 22, the countershaft 18, the toothed wheels 20, 23 and the coupling 25 to the driven shaft 12. The outer bearing piece 36 for the disk coupling with the shifting cylinder 37 and the toothed wheel 19 is hereby driven from the toothed wheel 21 through the toothed wheels 22, 20 and 19 with a smaller number of revolutions than the driving shaft 10. The jumper ring 44 is therefore located in the rotary position shown in Figure 2, at which the control groove connects the longitudinal boring 50, which leads to the pressure space, through 51, 52, 53, 54 with the return piping 55, respectively 67. The pressure space 41 is therefore without pressure, the piston 39 is pressed to the left by the spring 40 and the multiple disk clutch 35 disengaged. During this time the pressure liquid is guided from the pump 57 through the pipe line 58 into the control cylinder 59 and cam, since the control slide 60 is as a consequence of the small numbers of revolutions of the driving shaft in its upper position, flow back through the pipe line 70 with the relief valve 71 into the container 56. The fluid pressure is hereby for the main part determined by the spring pressure of the relief valve 71. If the engine is throttled down, so that the car begins to push, the freewheel 33 loosens itself as a result of the reversing of the direction of rotation, in that the intermediate shaft 11 as well as (after a certain relative number of revolutions, which is determined by the transmission of the toothed wheel pairs 21, 22 and 20, 19, between the two shafts) also the shifting cylinder 37 with the control member 44 overtake the driving shaft 10 in direction x. The jumper ring 46, which is in friction contact with the shaft 10, is as a result relatively to the control ring 44 changed to the position in accordance with Figure 3.

The connection between the pressure space 41 (respectively the pipe line 50) and the return piping 55 is interrupted and a connection between the cross boring 45 and the pipe line 50 to the pressure cylinder 41 through the control groove is established. Now the pressure fluid flows over from the pipe line 42 into the pressure space 41, which has as its cause that the piston is pressed to the right against the effect of the spring 40 and brings the multiple disk clutch to engagement. The driving comes then from the rear, that is from the driven shaft 12 through the toothed wheels 23, 24, the countershaft 18, the toothed wheels 20, 19 and the coupling 35 to the driving shaft 10. This corresponds to the transmission in the second gear. The liquid pressure, which is determined by the force on the spring of the relief valve 71 in the return piping 70, is hereby suitably only rated so high that the coupling engagement in the multiple disk clutch is just sufficient, in order to drag the engine along by the pushing car. Therefore the engine does not go beyond a certain low number of revolutions, and after gas is given again, recouples practically immediately with the driven gear of the vehicle without the necessity of first being much accelerated. Simultaneously the small coupling pressure effects that, when gas is given again, the coupling can pull along, whereby the jumper ring 46 is again taken by the driving shaft 10 from the position in accordance with Figure 2 and thereby places the pressure space 41 again under pressure from the outside. The multiple disk clutch 35 disengages itself and the freewheel 33 catches anew. The first gear is effected again.

*Second gear.*—If the number of revolutions of the engine increases and thereby that of the gear shafts coupled with it, a deflecting of the governor 69 results at a certain number of revolutions of the driven shaft 12 namely at a certain travelling speed of the vehicle, which has as its consequence that the control slide 60 is changed to its lower control position. As a result the pipe line 70 is blocked by the control edge 62 and simultaneously the pipe line 72 is released by the control edge 62. Due to the higher spring pressure of the relief valve 73 the liquid pressure in the control cylinder 59 and thereby in the pipe line 42 is rising. As long as the driving of the vehicle is operated by the engine namely by the driving shaft 10, that is, when the jumper ring 46 is in the position in accordance with Figure 2, the liquid has after the effected change of the steering slide 60 by the governor 69 still no access to the pressure space 41 of the multiple disk clutch 35, so that the car at first continues to drive in the first gear.

For the shifting into the second gear the driver must now, for example by releasing the foot throttle, retard the engine, whereby the jumper ring 46 is brought from the position in accordance with Figure 2 to the position in accordance with Figure 3. The fluid, which is under high pressure, can now stream into the pressure space through the control groove 49 and the boring 50 and thereby engage the clutch. The toothed wheel 19 is thereby coupled with the driving shaft 10, which corresponds to a drive of the vehicle through the toothed wheels 19, 20, 24 and 23 in the second gear.

As a result of the higher pressure the clutch is hereby engaged so tightly that it can transmit also the highest driving moment from the engine to the vehicle.

In contrast to the above described manner of action, which resulted upon return to engine drive under the prerequisite of a travelling speed in the range of the first gear, in this case, also after gas is given, no return shifting to the first gear is effected, since, because of the higher shifting pressure utilized for coupling, a slipping of the multiple disk clutch 35 also then does not take place, when the engine takes over the drive again. The jumper ring 46 remains consequently in the position in accordance with Figure 3. Only, if the vehicle retards so far that the governor 69 goes back into its initial position and consequently the fluid pressure diminishes again, and the multiple disk clutch is partially disengaged, a turning back of the jumper ring 46 into the position in accordance with Figure 2 and thereby a reshifting of the first gear can be effected.

*Third gear.*—The shifting from the second to the third gear, respectively from the gear group comprising the first and second gears to the gear group comprising the third and fourth gears, is principally effected by shifting the change coupling 25, 26 from the right to the left position. The shifting can hereby be operated also by hand or also automatically, for example in dependence upon a special governor of the number of revolutions or the like. Simultaneously with the shifting of the change coupling 25, 26 also the shift valve 66 is shifted back into its other position in the direction of the arrow, whereby the lower surface of the piston 64 is placed under pressure through the pipe line 65.

This has as a consequence that the piston 64 is moved upward—for example as far as a stop— and hereby strains the spring 63 additionally. The governor 69 must work against this additional strain of the spring. Consequently it will only deflect at a higher number of revolutions, which is determined by this strain of the spring.

If therefore willingly or automatically shifting has been effected from the first gear group (first and second gears) to the second gear group (third and fourth gears), the control slide 60 will, if the travelling speed is within (or occasionally also below) the range provided for the third gear, go back to the upper position shown in the drawing. If, before the second gear was shifted, the multiple disk clutch 35 is disengaged again as a result of the diminishing of pressure in the pressure space 41, and the immediate coupling of the driving shaft 10 with the intermediate shaft 11 through the freewheel 33 is effected. The drive is then immediately transmitted in direct gear immediately from the driving shaft 10 through the freewheel 33 to the intermediate shaft 11 and from there through the change coupling 25 to the driven shaft 12. At a reversing of the drive direction (at pushing vehicle) temporarily—as in the case of the first gear from this to the second gear—it is shifted to the fourth gear, in that the jumper ring 46 takes its relative rotary position in accordance with Figure 3.

*Fourth gear.*—If the speed of the vehicle rises beyond the speed limit provided for the shifting of the fourth gear, the governor 69 deflects again, the control slide 60 is changed downward again and the pressure of the shifting liquid is again strengthened in accordance with the stronger weight on the spring of the relief valve 73. Upon release of the throttle the fourth gear can then engage itself, so that no reshifting to the third gear takes place, when gas is given again. The drive is in this case effected in overdrive from the driving shaft 10 through the multiple disk clutch 35, the toothed wheels 19, 20, the countershaft 18, the toothed wheels 22, 21 (with intermediate shaft 11) and the change coupling 25 to the driven shaft 12.

*Reverse gear.*—For reversing the reverse gear (not shown) is engaged into the teeth of the toothed wheels 31 and 32. For the rest the drive is effected as in the first gear.

If a backward rolling of the vehicle, for example in a slope, takes place, while the ahead gear is shifted in, the relative drive relations at the freewheel 33 are principally the same as if the first gear is shifted in and the engine drives forward. Consequently the drive will transmit from the driven shaft 12 through the freewheel coupling 33 to the driving shaft 10. Since hereby the shaft 10 overtakes the part 44 opposite to the arrow direction x, the jumper ring adjusts itself into the position in accordance with Figure 3. Since the oil pump runs backward, no oil pressure is existent. Therefore no pressure on the coupling is effected, so that the drive is not blocked (as it would for example be the case, if a counter-freewheel is used, which works against the freewheel 33 and replaces the clutch 35). At a backward rolling of the vehicle and shifted in reverse gear the drive will take place under release of the freewheel 33 and under changing of the jumper ring 46 into the position in accordance with Figure 3 through the multiple disk clutch 35 (that is in the shifted gear drive ratio with the vehicle driving the engine).

A somewhat different way of shifting, hydraulic as well, is shown in Figure 5. The pressure pipe 58 of the pump 57, which is for example driven by the driven shaft 12 of the transmission, delivers in this case into a control space 74 of the control cylinder 75, in which the control slide 76 with the piston parts 77 and 78 slides, and from which also the pipe line 42 branches off to the shifting space 41 of the clutch 35. The space 80 is joined to the pressure pipe 58, respectively to the control space 74 or the pipe line 42 through a branch piping 79. A pressure spring 81 seeks to press the control slide 76 in upward direction. With its other end the spring abuts against the casing of the control cylinder 75 or another stationary part, it can, however, also support itself against an adjustable spring support, if required.

The cylinder 75 is connected to two pipe lines 82 and 83, the latter of which is brought only in connection with the pressure pipe 42, if the control slide takes a lower position by compressing the spring 81, in connection with a second control cylinder 84, in which a control slide with the piston parts 86 and 87, which is constructed as a differential piston. The piston parts enclose between themselves a control space 88, to which can, if required, be connected a return piping 90, which is for example provided with a throttle member or check valve 89, a lubrication piping for lubricating the gear or another piping for utilization or reconducting of excessive pressure fluid, which is conveyed by the pump 57. The pipe line 83 is furthermore in connection with the space 92 above the piston part 86 through a branch pipe line 91.

The control slide 85 is connected with an actuating rod 93, on which the governor 93 acts in such a manner that the control slide 85 is changed against the effect of the governor spring 95, when the governor reacts.

The position of the spring support 96, which is controlled in a suitable manner, can—similar to the spring support 64 in accordance with Figure 4—be changed by a lever 97. The latter can hereby again be coupled with the gear shift lever for the change coupling 25, 28, and can for example be operated together with it at discretion or automatically. In the pressure pipe 58 furthermore a control valve 98 can be arranged, which permits a blocking of the liquid to the control cylinder 75 by reconducting through a return piping 99. The manner of action of the shifting valve is the following: If the lever 97 respectively the spring support 96 are in the fully drawn out lower position, the spring is only under relatively low initial tension, which (similar to the effect of the spring 63) keeps the balance of the governor 94 until a number of revolutions of the governor shaft is attained, which is provided for the shifting from the first to the second gear, in such a manner that until that time the pipe line 82 is in connection with the control space 88 while the pipe line 83 is blocked off from it. The pressure fluid delivered by the pump 57 will therefore change the position of the control slide through the branch pipe line 79, 80 only so far downward against the effect of the spring 81, that it can flow off through the pipe line 82 to the pressure space 84 and from there through 90. The control space 74 inclusive the pipe line 42 is therefore under one pressure, which is determined by the initial tension of the spring 81 (approximately in accordance with the shown position of the control slide 76). As a result of the construction of the control slide 85 as a differential piston, furthermore an additional force, working against the regulator 94, is exercised by the pressure in the space 88.

If the number of revolutions of the regulating shaft (at an unchanged position of the lever 97) increases beyond the value intended for the shifting of the second gear, the pipe line 82 is blocked by the piston part 86 through corresponding deflection of the governor weights, while simultaneously the pipe line 83 is released by the piston part 87. The pressure fluid can therefore no longer flow out from the control space 74 through the pipe line 82, but is forced to change the position of the control slide 76 under increase of the pressure farther downward against the effect of the spring 81, until the piston part 78 of the slide has released the pipe line 83 as well, and now permits a flowing off through the pipe line. The pressure in the pipe line 42 is in this case determined by the higher tension of the spring 81. Simultaneously the space 88 as well as the space 92 on both sides of the control piston 86 is through the pipe line 83 placed under a certain higher pressure, which has as its consequence that now an additional force supports the effect of the governor 94 and pushes the control slide additionally downward. Through corresponding rating of the two control pistons 86, 87 as well as of the pressure, which is exercised in the control spaces 88 and 92, and is, if required, controllable through adjustment of the check valve 89, the possibility is given to achieve a desired hysteresis effect of the governor 94: the upward shifting to higher pressure will be carried out at a higher travelling speed than the downward shifting to lower pressure.

Through changing of the lever 97 and of the spring support 96 into the position 97' respectively 96' a shifting in the second shifting range, for example between a third and a fourth gear, can be achieved in an appropriate manner. The shifting valve 98, for which provision can also be made in Fig. 4 in a similar manner, permit interrupting the pressure on the shifting clutch 35 at discretion, that is, to shift from the higher gear in each case to the lower gear in each case. For the rest the description given for the example of construction in accordance with Figures 1–4 is also true for the example of construction in accordance with Figure 5.

A change of the position of the spring support (64 in Figure 4, 96 in Figure 5) can be dispensed with, if the governor (69 respectively 94) is in lieu of the driven shaft driven by the countershaft or an appropriately driven shaft, since the governor rotates in this case already with a different drive ratio, coordinated with the gear groups, with regard to the driven shaft of the transmission, i. e.—in accordance with the examples of construction—in the first and second gears with the transmission of the toothed wheels 23, 24, in the third and fourth gears with the transmission of the toothed wheels 21 and 22. If required, upon driving of the governor by the driven shaft of the transmission or by another shaft constantly connected with the driven part respectively the vehicle axle a special transmission gear can be inserted between driven shaft and governor, through which the number of revolutions of the governor is controllable in accordance with the inserted gear group.

Instead of a hydraulic shifting provision can also be made for any other shifting by means of an auxiliary force. The jumper ring 46 or an appropriately acting other shifting member can hereby principally take over the shifting effect of a freewheel by mediation of that auxiliary force, whereby the auxiliary force serves for operating the clutch 35 or another corresponding clutch. The auxiliary force can for example beside hydraulic also be of pneumatic or electromagnetic nature, or, for example a hydrostatic shifting clutch can for example be utilized. The jumper ring, respectively the clutch controlled by such a jumper ring has the advantage above a freewheel, that—while the freewheel (for example as a counter-freewheel) fails to act under certain circumstances (for example at backward movement of the vehicle or for utilization of the braking effect of the engine on slopes)—the clutch can be put to work by appropriate control of the auxiliary force, completely at random, at will or automatically.

If required, the higher or lower shifting pressure can also be produced by different pressure producers, for example different pumps, which supply alternately the pipe line 42 or through separate pipe lines and separate control channels in the jumper ring 46 the shifting space 41, whereby for example upon connecting of one pipe line the other pipe line is disconnected. The shifting of the higher gear in each case is in this case done directly, i. e. without closing the throttle.

Instead of the alternate creation of a higher or lower, respectively the creation of a variable shifting pressure, an effect of a shifting coupling corresponding to the effect of a freewheel can also be achieved by utilizing a constant shifting pressure respectively a constant auxiliary force. The coupling would in this case, as soon as the shifting space 41 receives pressure, always be under full shifting pressure. In order to make feasible a back shifting from the higher to the lower gear in each case in spite of this, when after a drive by the pushing vehicle the engine takes over the drive again, one coupling part can with its drive be connected in the direction of rotation in such a manner that upon reversing of the driving direction the torque to be transmitted effects a limited relative movement between the parts of the clutch and thereby between the jumper ring, which is connected with one coupling part by friction coupling, and the control ring, which may be turned to it in a limited manner and is for example rigidly connected with the other coupling part.

In Figure 6 an example of such an arrangement is shown. In contrast to the example of construction in accordance with Figure 1 the coupling bearer is not rigidly connected to the shaft 10, but located on it in a limited rotary manner. For this purpose the driving shaft 10 is provided with a cross-pin 100 (or appropriate stops), which acts together with springs 101, 102, respectively 103, 104, which are arranged between the cross-pin 100 and the coupling bearer 34 in circumference direction, and whereby the relative turn is limited between the shaft 10 and the coupling bearer by stops 105, 106 respectively 107, 108, which become alternatingly adjacent to the cross-pin 100.

The freewheel can hereby (in accordance with Figure 1 on its outside diameter) support itself against the shaft 10 or against the coupling bearer 34.

If the engine namely the shaft 10 starts driving in direction of rotation $x$ (Figs. 2 and 3), the springs 101, 103 are pressed together, while the springs 102, 104 are released and the drive is transmitted by the stops 105, 107. The jumper ring 46 takes the position in accordance with Figure 2. If at pushing vehicle the coupling bearer 34, which is rigidly coupled to the driven part by the clutch 35, overtakes the shaft 10, the cross-pin 100 abuts the stops 106, 108 under corresponding change of tension of the springs 101 to 104. The jumper ring 46 can as a consequence return into the position in accordance with Figure 2, without the necessity of a slipping of the clutch 35. The springs 101 to 104 (particularly 102, 104) must in this case be sufficiently soft, in order to admit already at a small torque, as it occurs for example at a dragging of the engine by the pushing car, the turning of the shaft 10 relatively to the coupling bearer 34 from the stop 105, 107 to the stop 106, 108. The stops themselves can also be constructed elastic themselves, for example as springs or of rubber. If required, also the relative motion of the parts 10 and 34 towards each other—omitting a special jumper ring 46—can be utilized directly for shift control of the auxiliary force.

In lieu of the mulitple disk clutch, of course, also a conical clutch or another suitable clutch can be utilized.

The invention is not restricted to the illustrated examples of construction, but can be varied at discretion within the individual ideas of the invention.

What I claim is:

1. In a variable drive ratio power transmission having a driving member and a driven member and gears therebetween providing at least two drive ratios, a one-way drive clutch adapted to drive through certain of said gears to cause the driving member to drive the driven member in one of said drive ratios, a second clutch which when engaged drives through others of said gears to provide another drive ratio connection between the driving and driven members, and automatic means for causing said second clutch to be engaged when the driven member overtakes the driving member, said automatic means comprising shifting means operated in response to a relative movement between said driving member and said driven member, and means controlled by said shifting means for engaging said second clutch in one position of said shifting means and for disengaging said second clutch in another position of said shifting means.

2. The combination according to claim 1 in which the second mentioned clutch is a friction clutch.

3. In a variable drive ratio power transmission having a driving member and a driven member and gears therebetween providing at least two drive ratios, a one-way drive clutch adapted to cause the driving member to drive the driven member through certain of said gears in the lower one of said drive ratios, a second clutch which when engaged drives through others of said gears to produce the higher drive ratio connection between the driving and driven members, and automatic means for causing said second clutch to be engaged when the driven member overtakes the driving member, said automatic means comprising shifting means connected with one of said members only by friction and with the other member for limited rotation, and means controlled by said shifting means to cause said second clutch to be engaged in one position of said shifting means and disengaged in another position of said shifting means.

4. The combination according to claim 3 in which the second clutch is operated by hydraulic means and the shifting means comprises control valve means for controlling the application of pressure fluid to said hydraulic clutch operating means.

5. The combination according to claim 3 in which the second clutch is operated by hydraulic means and the shifting means comprises control valve means for controlling the application of pressure fluid to said hydraulic clutch operating means together with spring means for urging said shifting means to one of its positions.

6. The combination according to claim 3 in which the second clutch is operated by hydraulic means and the shifting means comprises control valve means for controlling the application of pressure fluid to said hydraulic clutch operating means together with speed responsive means effective to determine the pressure of said fluid.

7. In a variable drive ratio power transmission having a driving member and a driven member and gears therebetween providing at least two drive ratios, a one-way drive clutch adapted to drive through certain of said gears to cause the driving member to drive the driven member in one of said drive ratios, a second clutch which when engaged drives through others of said gears to provide another drive ratio connection between the driving and driven members, and automatic means for causing said second clutch to be engaged when the driven member overtakes the driving member, said automatic means comprising shifting means operated in response to relative movement between said driven member and said driving member, and hydraulic means controlled by said shifting means together with valve means for controlling the application of pressure fluid to said hydraulic means, said valve means being effective to apply pressure fluid to said second clutch engaging means when the drive is in that direction in which the drive is not transmitted through said one-way clutch.

8. The combination according to claim 7, together with means for changing the pressure of said pressure fluid comprising a control valve having a control space, a spring acting on said control valve, a source of pressure fluid connected to said control space, a conduit leading from said control space to said operating means for said second clutch, two conduits controlled by said control valve, a relief valve for each of said two conduits operating at different release pressures, hydraulically operated means for changing the position of said control valve against the action of said spring to determine which of said two conduits shall be subjected to pressure.

9. The combination according to claim 7, together with means for changing the pressure of said pressure fluid comprising a control valve having a control space, a spring acting on said control valve, a source of pressure fluid connected to said control space, a conduit leading from said control space to said operating means for said second clutch, two conduits controlled by said control valve, a relief valve for each of said two conduits operating at different release pressures, hydraulically operated means for changing the position of said control valve against the action of said spring to determine which of said two conduits shall be subjected to pressure together with means for varying the pressure fluid in accordance with the rotative speed of the driven member.

10. The combination according to claim 3 in which the second clutch is operated by hydraulic means and the shifting means comprises control valve means for controlling the application of pressure fluid to said hydraulic clutch operating means together with speed responsive means driven by the driven member and adapted to cause the second clutch to be applied for driving in both directions of rotation.

11. In a variable drive ratio power transmission having a driving shaft, a driven shaft, an intermediate shaft co-axially arranged between said driving and driven shafts and a countershaft generally parallel to said other shafts, a gear co-axial with the first mentioned shafts and freely rotatable relative thereto and meshing with a gear on the countershaft, a pair of intermeshing gears connecting the intermediate shaft with the countershaft, a gear on the driven shaft meshing with a gear on the countershaft, a change coupling adapted to couple the gear on the intermediate shaft or the gear on the driven shaft with the driven shaft, and a one-way clutch between the driving shaft and the intermediate shaft and a second clutch adapted to couple the driving shaft with the first mentioned gear.

12. The combination according to claim 11 together with means for automatically engaging said second clutch whenever the drive occurs in that direction in which it is not transmitted by the said one-way clutch.

13. The combination according to claim 11 together with means for automatically engaging said second clutch whenever the drive occurs in that direction in which it is not transmitted by the said one-way clutch, and together with means for engaging said second clutch irrespective of the direction of drive.

14. The combination according to claim 11 together with means for automatically engaging said second clutch whenever the drive occurs in that direction in which it is not transmitted by the said one-way clutch, and together with means for engaging said second clutch irrespective of the direction of drive, and means coacting with both of said means for adjusting said change coupling.

References Cited in the file of this patent
UNITED STATES PATENTS

| Number | Name | Date |
| --- | --- | --- |
| 2,014,662 | Nardone | Sept. 17, 1935 |
| 2,016,835 | Nardone | Oct. 8, 1935 |
| 2,019,174 | Clark | Oct. 29, 1935 |
| 2,056,365 | Rauen | Oct. 6, 1936 |
| 2,187,835 | Martin | Jan. 23, 1940 |
| 2,264,001 | McKechnie | Nov. 25, 1941 |
| 2,302,312 | Greenlee | Nov. 17, 1942 |
| 2,320,960 | Wheaton | June 1, 1943 |
| 2,376,545 | Livermore | May 22, 1945 |
| 2,456,600 | Trout | Dec. 14, 1948 |
| 2,534,134 | Kirkpatrick | Dec. 12, 1950 |